United States Patent
Rannow et al.

(10) Patent No.: US 11,652,648 B2
(45) Date of Patent: May 16, 2023

(54) AUTHENTICATION BETWEEN A TELEMATIC CONTROL UNIT AND A CORE SERVER SYSTEM

(71) Applicant: GlobalmatiX AG, Vaduz (LI)

(72) Inventors: Holger Rannow, Vaduz (LI); Gerhard Schober, Vaduz (LI)

(73) Assignee: GlobalmatiX AG, Vaduz (LI)

( * ) Notice: Subject to any disclaimer, the term of this patent is extended or adjusted under 35 U.S.C. 154(b) by 238 days.

(21) Appl. No.: 17/004,640

(22) Filed: Aug. 27, 2020

(65) Prior Publication Data
US 2021/0067353 A1   Mar. 4, 2021

(30) Foreign Application Priority Data
Aug. 27, 2019  (EP) .................................. 19193870

(51) Int. Cl.
H04L 9/32      (2006.01)
H04L 67/02     (2022.01)
H04L 67/12     (2022.01)
H04W 84/04     (2009.01)

(52) U.S. Cl.
CPC .......... H04L 9/3271 (2013.01); H04L 9/3213 (2013.01); H04L 67/02 (2013.01); H04L 67/12 (2013.01); H04W 84/042 (2013.01); H04L 2209/84 (2013.01)

(58) Field of Classification Search
CPC .............................. H04L 9/3271; H04L 67/12
See application file for complete search history.

(56) References Cited

U.S. PATENT DOCUMENTS

2017/0063994 A1*  3/2017  Lei ......................... G06F 3/0482
2017/0272945 A1*  9/2017  Link, II ............... H04W 12/041
2019/0156019 A1   5/2019  Chen
2020/0295933 A1*  9/2020  Link, II .................. H04W 4/70
2021/0185042 A1*  6/2021  Sharma .................. H04W 4/70

FOREIGN PATENT DOCUMENTS

WO         2016137374 A1      9/2016

OTHER PUBLICATIONS

Extended European Search Report for European Patent Application No. 19193870.3, dated Feb. 17, 2020, 8 pgs.
Gharsallah Ikram et al: A Secure Efficient and Lightweight authentication protocol for 5G cellular networks: SEL-AKA, 2019 15th International Wireless Communications & Mobile Computing Conference (IWCMC), IEEE, Jun. 24, 2019 (Jun. 24, 2019), pp. 1311-1316, XP033578032, DOI: 10.1109/IWCMC.2019.8766448 [retrieved on Jul. 18, 2019] p. 1313-p. 1315, Abstract included.

* cited by examiner

Primary Examiner — Esther B. Henderson
(74) Attorney, Agent, or Firm — Kowert, Hood, Munyon, Rankin & Goetzel, P.C.

(57) ABSTRACT

The invention concerns a scheme for authentication between a telematic control unit (10) for a machine for industrial usage (220), preferably a vehicle, and a core server system (40). The telematic control unit (10) is associated with a hardware identifier and comprises an identity module (14) storing an identifier of the identity module (14) and a secret key which is specific to the identifier. The core server system (40) is connected to a telecommunication server (25) of a public land mobile network, wherein the telecommunication server (25) also has access to the secret key which is specific to the identifier. The inventive authentication scheme preferably relies on an advantageous use of a unique hardware identifier of the telematic control unit.

20 Claims, 3 Drawing Sheets

AUTHENTICATION BETWEEN A TELEMATIC CONTROL UNIT AND A CORE SERVER SYSTEM

This application claims priority to European Patent Application Number 19193870.3 titled "Authentication between a telematic control unit and a core server system" and filed on Aug. 27, 2019, which is hereby incorporated by reference in its entirety, as though fully and completely set forth here.

The present invention is directed to a method and system for authentication between a telematic control unit for industrial machine usage and a core server system for performing the method for authentication. The inventive authentication scheme preferably relies on an advantageous use of a unique hardware identifier of the telematic control unit.

It is desirable to safely connect machines, e.g. vehicles, via preferably wireless networks to a core server system, to allow for the monitoring, maintenance or control of said machines. For this reason, the machine is provided with a telematic control unit, which typically comprises an interface for locally connecting the machine to said telematic control unit. Said telematic control unit may be capable of monitoring the data transfer within said machine, and of accessing data stored on the machine.

At least some of said monitored or stored data may be used to enhance the lifetime of the machine. For example, in a connected car environment, data concerning servicing and life cycle of the machine may be managed, for example with the help of a core server system operated by the manufacturer of the car. The core server system may offer access to its services via an Internet Protocol (IP) based connection, for example using a message queuing telemetry transport (MQTT) protocol and/or a hypertext transfer protocol (HTTP). A core server system is a system which comprises the components which facilitate data communication the machine so that the service can be used.

The data exchanged between the telematic control unit and the core server system may comprise trade secrets of the manufactures of said machines, or it may be subject to other confidentiality constraints. Therefore, a secure data transfer between the machine and a communication network is desired. In particular, the telematic control unit and/or the core server system should be authenticated vis-à-vis each other before any payload data is transmitted via the IP-based connection.

WO 2019/104125 A1 discloses a method for securely authenticating an IoT (Internet of Things) device like a telematic control unit and an application server like an MQTT server connected via a network vis-à-vis each other. The method comprises establishing a network connection with a network operator server via a control channel, establishing the identity of the network operator server using a pre-shared server key, establishing the identity of the IoT device using a pre-shared client key stored on a secure element like a SIM (subscriber identity module), and cryptographically generating a session key for authentication of the IoT device at the beginning of a data session between the IoT device and the application server. The pre-shared server key, the pre-shared client key stored on the secure element and the session key are based on protocols implemented by a public land mobile network.

One drawback of said method is that the identification of said IoT device may be manipulated because any IoT device which is in possession of the secure element like the SIM may be able to access the server. Another drawback is that since the session key is generated in accordance with the protocols implemented by the public land mobile network, authentication of the IoT device by the application server is also based on these public land mobile network protocols.

The object of the present invention is to overcome one or more of the drawbacks of the prior art. In particular, embodiments of the present invention may provide a method or system for authentication of a telematic control unit for industrial machine usage, which enhances the security and/or manageability of a connection between a core server system and a telematic control unit by more securely authenticating the telematic control unit and/or decoupling the data connection from the public land mobile network protocols.

At least some of said problems are overcome by the method and the systems according to the independent claims.

One embodiment of the present invention is a method of authentication between a telematic control unit for a machine for industrial usage, preferably a vehicle, and a core server system, the telematic control unit being associated with a hardware identifier and comprising an identity module storing an identifier of the identity module and a secret key which is specific to the identifier, the core server system being connected to a telecommunication server of a public land mobile network, the telecommunication server also having access to the secret key which is specific to the identifier, the method comprising the steps of:

a) transmitting the identifier of the identity module from the telematic control unit 10 the core server system, and from the core server system to the telecommunication server;

b) generating, on the telecommunication server, a challenge code (RAND) and an expected response (XRES) based on the challenge code (RAND) and the secret key specific to the identifier of the identity module, and transmitting the challenge code (RAND) and the expected response (XRES) from the telecommunication server to the core server system;

c) storing the expected response (XRES) in the core server system and transmitting the challenge code (RAND) from the core server system to the telematic control unit;

d) generating, on the telematic control unit, a response (RES) based on the challenge code (RAND) and the secret key specific to the identifier of the identity module, and transmitting the response (RES) from the telematic control unit 10 the core server system;

e) on the core server system, comparing the response (RES) to the expected response (XRES), and in case of a match, generating an authentication token (xT) on the core server system (40) and transmitting the authentication token (xT) from the core server system to the telematic control unit;

f) transmitting the authentication token (xT) from the telematic control unit to the core server system, authenticating the telematic control unit on the core server system based on the transmitted authentication token (xT), and starting a payload data communication or session between said telematic control unit and said core server system, preferably using an Internet Protocol (IP) based application layer protocol, like a message queuing telemetry transport and/or a hypertext transfer protocol.

Another embodiment of the present invention is a method performed by a core server system, for authentication with a telematic control unit for a machine for industrial usage, preferably a vehicle, the telematic control unit being associated with a hardware identifier and comprising an identity module storing an identifier of the identity module and a secret key which is specific to the identifier, the core server system being connected to a telecommunication server of a public land mobile network, the telecommunication server also having access to the secret key which is specific to the identifier, the method comprising the steps of:

a) receiving the identifier of the identity module from the telematic control unit, and transmitting it to the telecommunication server;

b) receiving, from the telecommunication server, a challenge code (RAND) and an expected response (XRES) based on the challenge code (RAND) and the secret key specific to the identifier of the identity module;

c) storing the expected response (XRES) and sending the challenge code (RAND) to the telematic control unit;

d) receiving, from the telematic control unit, a response (RES) based on the challenge code (RAND) and the secret key specific to the identifier of the identity module;

e) comparing the response (RES) to the expected response (XRES), and in case of a match, generating an authentication token (xT) on the core server system (40) and sending the authentication token (xT) to the telematic control unit;

f) receiving the authentication token (xT) from the telematic control unit, authenticating the telematic control unit on the core server system based on the transmitted authentication token (xT), and starting a payload data communication or session between said telematic control unit and said core server system, preferably using an Internet Protocol (IP) based application layer protocol, like a message queuing telemetry transport and/or a hypertext transfer protocol.

Yet another embodiment of the present invention is a method performed by a telematic control unit (10) for a machine for industrial usage (220), preferably a vehicle, for authentication with a core server system (40), the telematic control unit (10) being associated with a hardware identifier and comprising an identity module (14) storing an identifier of the identity module (14) and a secret key which is specific to the identifier, the core server system (40) being connected to a telecommunication server (25) of a public land mobile network, the telecommunication server (25) also having access to the secret key which is specific to the identifier, the method comprising the steps of:

a) sending the identifier of the identity module (14) to the core server system (40);

c) receiving a challenge code (RAND) from the core server system (40);

d) generating a response (RES) based on the challenge code (RAND) and the secret key specific to the identifier of the identity module (14), and sending the response (RES) to the core server system (40);

e) receiving an authentication token (xT) from the core server system (40);

f) sending the authentication token (xT) to the core server system (40), and starting a payload data communication or session (35) with said core server system (40), preferably using an Internet Protocol (IP) based application layer protocol, like a message queuing telemetry transport and/or a hypertext transfer protocol.

With respect to this patent application, a machine for industrial use is preferably a vehicle, like a car or a lorry, or a vending machine for vending goods, or a power generator, in principle a machine in the high price segment, which comprises a telematic control unit and is preferably used for business cases (B2B).

Preferably said core server system is embedded in a cloud system. A cloud system is a decentralized server system, wherein each server comprises an individual computing unit and storing unit, like a database. Said core server system may comprise several sub-servers, like an authentication server and/or a communication server, like a Message Queuing Telemetry Transport (MQTT) server, e.g. an MQTT-broker, or an HTTP(s) (Hypertext Transfer Protocol Transport), AMQP (Advanced Message Queuing Protocol) or STOMP (Streaming Text Oriented Messaging Protocol) server, using an Internet Protocol (IP) based data connection between said core server system and said telematic control unit. The core server system core may also comprise a core server interface, which is used to communicate with an interface of said telematic control unit. The computing unit of said corer server interface may perform several authentication steps, like a comparison of incoming and outgoing signatures, IDs, keys and/or codes.

The identity module is preferably comprised by a GSM (Global System for Mobile Communications) module, and is e.g. a SIM (Subscriber Identity Module) or an embedded e-SIM. (e-)SIMs are easy to produce and can be reconfigured with several IMSIs and/or Multi-IMSI Profiles. Alternatively, the identity module may be implemented in software. The identifier of the identity module may be an IMSI (International Mobile Subscriber Identity) number of said GSM module of said telematic control unit and/or an MSISDN (Mobile Subscriber ISDN Number), which ensures a unique code for said GSM module of said telematic control unit. Therefore, a unique allocation of said GSM module of said machine for industrial usage is guaranteed The telecommunication server is preferably an HSS (Home Subscriber Server). The HSS is the entity containing the subscription-related information to support the GSM network entities handling mobility and user IP sessions. Said home subscriber server is further preferably a virtual home subscriber server, which is easy to configure in a cloud system and which is therefore accessible in a delocalized server system. The telematic control unit preferably establishes, in a first step, a data connection to a telecommunication server like a GGSN or a packet data gateway via said GSM module, and said data connection is according to a standard of a public land mobile network, such as a 3GPP or 3GPP2 standard, which not only allows for a mobile but also for a relatively save connection in a standardized manner. This mobile data connection can be used to establish data connection or communication between the telematic control unit and the core server system, preferably an Internet Protocol (IP) based connection or communication, even more preferably a TCP/IP-based connection.

In step a), the identifier of the identity module is transmitted from the telematic control unit 10 the core server system, and from the core server system to the telecommunication server. It may be transmitted from the telematic control unit 10 the core server system as a parameter of an authentication request, e.g. an HTTP(s) login request message. A time stamp may also be transmitted from the telematic control unit 10 the core server system, and in addition a security signature, like an RSA signature based on a private key of the telematic control unit, for example as further parameters of the authentication request. This can prevent manipulation of the authentication request or the parameters transmitted in step a). RSA signature systems are typically based on a private key and a public key, which are generated by one party. Said private key is used for signing certain messages or elements thereof by encrypting them, and said public key made available to a recipient of the messages and used by the recipient for verifying the messages by decrypting them. The signature can also enhance authentication security because it proves that the sender is in possession of the private key.

In step b), said identifier of the identity module is compared to an identifier of the identity module hosted on said telecommunication server, and said telecommunication server generates the challenge code (RAND) and the expected response (XRES) based on the challenge code (RAND) and the secret key specific to the identifier of the identity module (14). The telecommunication server may also generate an integrity key (IK) and/or a ciphering key CK) and/or a network authentication token (AUTN). The generated element may be transmitted from the telecommunication server to the core server system as an authentication vector.

In step c), the expected response (XRES) is stored in the core server system, and the challenge code (RAND) is transmitted from the core server system to the telematic control unit, e.g. in an HTTP response message. Preferably, also the network authentication token (AUTN) is transmitted from the core server system to the telematic control unit, e.g. in the HTTP response message.

In step d), a response (RES) based on the challenge code (RAND) and the secret key specific to the identifier of the identity module is generated on the telematic control unit, and the response (RES) is transmitted from the telematic control unit 10 the core server system. This is typically achieved by transmitting the challenge code (RAND) to the identity module of the telematic control unit, where the response (RES) is generated using the secret key securely stored on the identity module. Preferably also the network authentication token (AUTN) is transmitted to the identity module, where the token may be verified using a network identity code or key securely stored on the identity module. In this manner, the core server system/telecommunication server is authenticated vis-à-vis the telematic control unit. If such authentication fails, the process may be aborted, e.g. before the response (RES) is generated.

In step e), the response (RES) is compared to the expected response (XRES) on the core server system, and in case of a match, an authentication token (xT) is generated on the core server system (40), and the authentication token (xT) is transmitted from the core server system to the telematic control unit. Preferably, the authentication token (xT) is generated on the authentication server of the core server system. The authentication token may be stored in said telematic control unit.

In step f), the authentication token (xT) is transmitted from the telematic control unit to the core server system, the telematic control unit is authenticated on the core server system based on the transmitted authentication token (xT), and an application layer payload data (use data) communication or session between said telematic control unit and said core server system is started, preferably using an Internet Protocol (IP) based application layer protocol (e.g. in accordance with the ISO/OSI layer model), like a message queuing telemetry transport and/or a hypertext transfer protocol. Message queuing telemetry transport (MQTT) protocol, which is an application-layer publish-subscribe-based messaging protocol. It works on top of the TCP/IP protocol suite and is designed for connections with remote locations where a small code footprint is required or the network bandwidth is limited. In addition, or alternatively, a hypertext transfer protocol (HTTP) such as a hypertext transfer secure protocol (HTTPs) may be used for the data communication or session, which is an application-level protocol for distributed, collaborative, hypermedia information systems.

In particular, a typical authentication signal will be sent to said telematic control unit 10 start the data communication. The payload data (use data) communication or session or between the telematic control unit and the core server system will only be started if the telematic control unit is successfully authenticated on the core server system based on the transmitted authentication token (xT). This means that the core server system will consider payload data (use data) transmitted from the telematic control unit only after successful authentication, and likely it will only after successful authentication send payload data (use data) to the telematic control unit. Preferably, the authentication by means of the authentication token is performed by an application layer server of the core server system, like the MQTT server.

Preferably said telematic control unit comprises a microcontroller with a first internet protocol transport stack. Said microcontroller may be used to control said data transfer and/or authentication process. Said first internet protocol transport stack of said telematic control unit may comprise a MQTT stack and/or an authentication stack, which is configured to authority and/or sign said authentication token. In a preferred embodiment, said core server system comprises an IP-based application layer server for communication with said telematic control unit. Said application layer server is configured to establish said data connection or session between said telematic control unit and said core server system, preferably by using said MQTT stack and said MQTT server, which enables a secure internet protocol transport connection.

According to the invention, first the standardized authentication mechanisms of a public land mobile network are used and based thereon, an authentication token is provided to the telematic control unit. In this manner, the telematic control unit can be reliably authenticated for use of the application layer services of the core server system without the need to make changes to the protocols according to which the communication between the telematic control unit and the core server system is performed.

The hardware identifier associated with the telematic control unit preferably has a one-to-one (biunique) correspondence with the telematic control unit. This means that the telematic control unit is associated with one and only one identifier, and the identifier is associated with only one telematic control unit.

The hardware identifier associated with the telematic control unit is preferably associated with a physical component of said telematic control unit, preferably having a one-to-one (biunique) correspondence with the physical component of the telematic control unit. Preferably, the hardware identifier is stored on (that physical component of) the telematic control unit, and even more preferably it can only be accessed and/or is locked by a firmware installed on (that component of the) telematic control unit.

The above-mentioned physical component is preferably a microcontroller unit comprised by the telematic control unit. In this case, the hardware identifier associated with the telematic control unit is or comprises an identifier of the microcontroller unit (MCUID), e.g. a microcontroller unit number, which is unique and preferably stored on the flash memory of the microcontroller unit. It can preferably only be read by the firmware installed on the microcontroller unit, and that firmware can be modified only by the manufacturer of the telematic control unit, not by unauthorised third parties. In turn, the microcontroller unit is typically fixed on the telematic control unit. Therefore, the hardware identifier will not be manipulatable and is uniquely associated with the telematic control unit.

In addition, or alternatively, the above-mentioned physical component may be a GSM unit comprised by the telematic control unit. In this case said hardware identifier may be or comprise an identifier of the GSM module, like an IMEI (International Mobile Equipment Identity), which is unique and stored on the GSM module. Said GSM module is typically fixed on said telematic control unit. Therefore, said hardware identifier will not be manipulatable and is uniquely associated with the telematic control unit.

As will be explained now below, the hardware identifier associated with the telematic control unit can advantageously be used in two ways for improving the inventive method of authentication: First of all, as an authentication feature, to enhance the standardized authentication mechanisms of the public land mobile network. Secondly, for generating the authentication token (Tx), so that the authentication token can only be used by the telematic control unit for which it is intended.

According to the first aspect, method, step a) comprises transmitting the hardware identifier associated with the telematic control unit from the telematic control unit 10 the core server system, and checking, by the core server system, whether the transmitted hardware identifier is associated with a telematic control unit which is authorized to access the core server system. Optionally, the core server system may also check whether the transmitted hardware identifier is associated with the transmitted identifier of the identity module. In case that the hardware identifier and the identifier of the identity module are transmitted in the same message, e.g. an authentication request, said authentication server may split the identifier of the identity module from said hardware identifier. Afterwards only the identifier of the identity module is sent to said telecommunication server. The hardware identifier may also be signed or covered by the signature of the authentication request as described above in the context of step a).

Said hardware identifier may be prestored in said core server system, especially in said authentication server of said core server system, e.g. in a list of hardware identifiers associated with telematic control units which are authorised to access the core server system. Thus, an unknown telematic control unit or an unknown microcontroller thereof will not be accepted during a comparison process of said transmitted hardware identifier and prestored hardware identifier in said core server system, and said authentication method may be aborted due to failure of acceptance of said delivered hardware identifier. E.g., an HTTP(s) login request message may be answered by the core server system by a reply including the 401 status code, indicating that the HTTP request has not been applied because it lacks valid authentication credentials.

In this manner, the hardware identifier associated with the telematic control unit is used as a further authentication feature. This enhances the security of the standardized authentication mechanism of the public land mobile network, which is based on a secret key shared by the identity module and the telecommunication server.

According to the second aspect, the authentication token (xT) is based on and/or comprises the hardware identifier associated with the telematic control unit. For doing so, the core server system may use a hardware identifier transmitted by the telematic control unit according as described above in the context of the first aspect. Alternatively, in particular if the first aspect is not used, the core server system may use a hardware identifier prestored on the core server system, and associated e.g. with the identifier of the identity module from the telematic control unit 10 the core server system in step a).

In this manner, the use of the authentication token by an unauthorised or unintended telematic control unit is prevented because the authentication token is directly linked to said telematic control unit by means of the preferably biunique hardware identifier. For example, a service provided by the core server system will typically be associated with the hardware identifier of a telematic control unit, i.e. the hardware identifier determines which telematic control unit is to be serviced. The core server system may decide which telematic control unit is to be serviced based on the hardware identifier comprised by the authentication token (xT). Alternatively, it may compare the hardware identifier comprised by the authentication token (xT) and a hardware identifier supplied as a parameter at the start of the a data communication or session, and deny authentication of the telematic control unit in case they do not match.

The generation of the authentication token (xT) according to the invention may be improved in a number of other ways:

For example, the authentication token (xT) may not be based on the challenge code (RAND), the expected response (XRES), the response (RES) and/or any other key or other element transmitted from the telecommunication server (25) to the core server system (40). Therefore, an authentication token is generated whose code sequence is independent of said GSM network identifier, said first authentication key, and said second authentication key of said GSM module of said telematic control unit, so that the authentication token is decoupled from the public land mobile network and its standards and procedures.

Furthermore, said authentication token may be signed or encrypted by the (authentication server of the) core server system. Preferably the authentication token is signed or encrypted by means of a private encryption key of said core server system. Said signature may be a one-way RSA signature or based on a digest generation. Said private key is a secret key only known within the core server system, especially known in the authentication server and/or the MQTT server.

By signing and/or encrypting the authentication token (xT), it can be ensured that the authentication token (xT) is not modified, e.g. during the transmission of the token between the core server system and the telematic control unit, and vice versa. Furthermore, it can be verified, e.g. by checking the signature using the public key of the core server system, that the authentication token (xT) was indeed generated by the (authentication server of the) core server system. The verification can be made by the telematic control unit, to authenticate the authentication token (xT) and/or the (authentication server of the) core server system. For example, said signed authentication token is authenticated in the telematic control unit, in particular in said interface of the telematic control unit, by checking the signature of the authentication token. More importantly, the verification can be made by the (authentication server of the) core server system in method step f), when authenticating the telematic control unit on the core server system based on the transmitted authentication token (xT). The authentication token (xT) does not even have to be stored on the core server system, for comparison with the authentication token (xT) transmitted to the core server system by the telematic control unit. This is because the signature/encryption of the authentication token (xT) allows the core server system to verify that the authentication token (xT) transmitted to the core server system by the telematic control unit is a valid authentication token (xT) generated by the core server system.

In a preferred configuration of said method said authentication token comprises a time stamp for indicating an expiration time of the token. After said expiration time, the core server system may reject a request by telematic control unit 10 start a payload data communication or session between the telematic control unit and the core server system. In this case, the telematic control unit may attempt that the authentication process be re-started, by once more performing steps a) through d). A typical duration, as indicated by the time stamp, after which the authentication token (xT) expires is 10 to 15 seconds from the generation of the authentication token (xT). Said verification using a time stamp enhances the safety of said connection due to minimization said time to crack the said authentication token for a third party.

In a preferred configuration of said method, said telematic control unit is connected to said machine for industrial usage and said authentication token is in addition or alternatively based on a hardware identifier of said machine for industrial usage. Said hardware identifier of said machine for industrial usage may comprise a machine identification number, e.g. a serial number of said machine for industrial usage and/or a serial number of a component of said machine for industrial usage. Said machine identification number may be a vehicle or and engine identification number. Therefore, access by an unauthorised machine of industrial usage to the core server system is prevented, because the authentication token is directly assigned to said machine of industrial usage. This increases further the security of the authentication process.

By way of example, the MQTT server in said core server system may verify said authentication token during said authentication in step f), before said payload data session between an MQTT stack of the telematic control unit and the MQTT server in the core server system starts. Said verification may comprise splitting said authentication token into at least said hardware identifier of said telematic control unit and/or a time stamp and/or a signature, and verifying a hash key signature of said hardware identifier and time stamp, using the public key of the core server system, which means that the MQTT server does not need to have access to the private key of the core server system. In case of a successful verification, a secure data transfer between said telematic control unit and said core server system is established and the payload data session is started.

In another use case, the authentication token is sent from said interface of the telematic control unit 10 said core server interface, and the computing unit of said core server interface checks said authentication token by means of the signature as described above. This configuration is preferably used when the IP-based application layer protocol used to for the payload data communication is a hypertext transfer protocol (HTTP).

Before-mentioned method for authentication of a telematic control unit, in particular said steps, may be performed as a (distributed) computer-implemented method, and the computer program which when executed performs the computer-implemented method may be stored on a (distributed) storage medium. Said computer program comprises at least part of said data commands based on said individual steps, mentioned in this application.

An inventive system comprises said authentication system according to said before-mentioned method for authentication of a telematic control unit and a machine for industrial usage, preferably a vehicle, where said telematic control unit is connected to a bus system of said machine for industrial usage with a communication connection, preferably connected to said vehicle. Using a bus system of said machine for industrial usage enables an easy access to the data communications within said machine for industrial usage.

Further advantageous aspects of the invention are explained in the following by means of exemplary embodiments and the figures. The wording first, second etc. are used to provide a differentiation between similar objects and does not necessarily comprise an enumeration or hierarchy. In the drawings, the invention is shown in a schematic manner.

Figure 1:
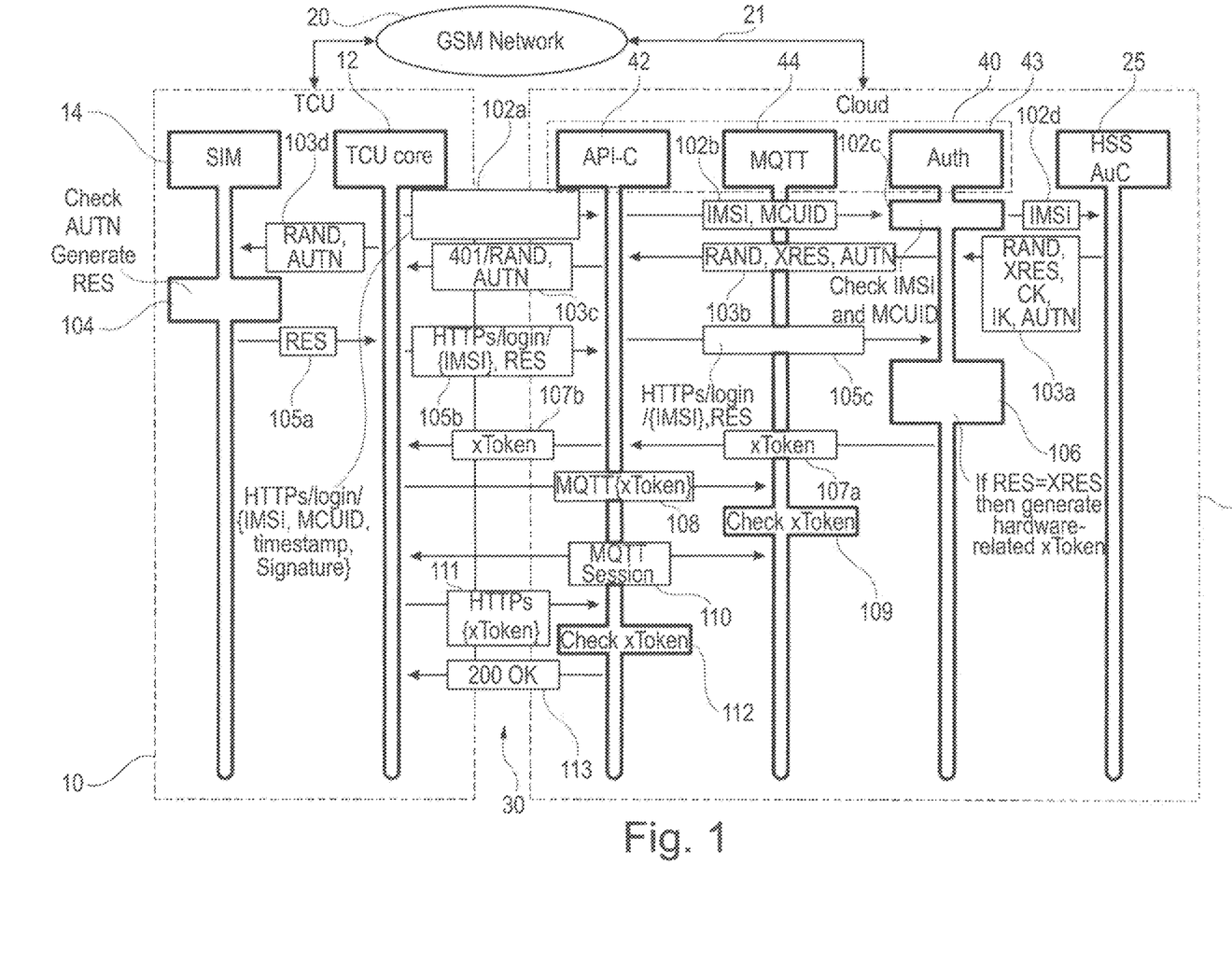
FIG. 1 shows a diagram disclosing said inventive method for authentication of a telematic control unit for a machine for industrial usage.

A preferred embodiment of a method for authentication of a telematic control unit (TCU) for a machine for industrial usage is shown in FIG. 1. Said method is performed using a public land mobile network like a GSM network 20, which connects the telematic control unit 10 with a core server system 40 connected to a telecommunication server, in particular an HSS (Home Subscriber Server) 25 of said GSM network 20. Telematic control unit 10 and core server system 40 are also connected via Internet Protocol (IP) based data connections 30, which may be built upon the public land mobile network connection. Telematic control unit 10 comprises a GSM module 14 and a TCU core, which comprises a microcontroller unit (MCU) 11 with a firmware which provides a TCU interface 12 to communicate with core server system 40. Core server system 40 comprises a computing unit and a storage unit (not shown in FIG. 1), an Application Programming Interface Center (API-C) providing a core server interface 42, an authentication server 43 and an MQTT (Message Queuing Telemetry Transport) server 44. Core server system 40 and said HSS 25 are embedded in a cloud system 50.

In a first step, not shown in FIG. 1, an authentication request is sent from GSM module 14 to HSS 25, and a public land mobile network data connection 21 between said GSM module 14 and HSS 25 is established, preferably in accordance with a 3GPP standard. An IP-based data connection 30 is established between telematic control unit 10 and core server system 40, typically built upon the public land mobile network data connection 21, for use of services offered by core server system 40 to telematic control unit 10.

Said IP-based data connection 30 between said telematic control unit 10 and said core server system 40 is used for transmitting an authentication request. Said authentication request is sent from said TCU interface 12 to core server interface 42 over said IP-based data connection 30 (step 102*a*). Said authentication request, which may be an HTPP(s) login request, comprises an identifier of an identity module, like an IMSI (International Mobile Subscriber Identity) number of a SIM-Card or eSIM 15 comprised by GSM module 14. Preferably it also comprises a time stamp, an RSA signature, and most preferably in addition a hardware identifier, which is assigned to said telematic control unit 10. Said hardware identifier is an identifier of a microcontroller unit comprised by the telematic control unit 10, in particular a microcontroller unit number MCUID, stored on the telematic control unit 10. Authentication server 43 receives said authentication request from core server interface 42 and filters said IMSI number from said hardware identifier (step 102b and step 102c). Said hardware identifier is compared to a hardware identifier of the microcontroller unit, or a list of such hardware identifiers, pre-stored in authentication server 43, and in case of a correct match, said IMSI number is sent to said HSS 25 (step 102d). Otherwise said authentication method may be aborted due to failure of acceptance of said delivered hardware identifier. E.g., the HTTP(s) login request message may be answered by the core server system by an HTTP(s) reply including the 401 status code (step 103c).

Said HSS 25 receives said IMSI number and compares said IMSI number with the hosted IMSI numbers, in said HSS 25. In case of a positive identification of said IMSI number, said HSS 25 generates an authentication vector comprising a randomly generated challenge code RAND and an expectation code XRES. The authentication vector may also comprise an integrity key IK, a cipher key CK, and a network authentication token AUTN. Said authentication vector is sent from said HSS 25 to said authentication server 43 (step 103a). Said authentication server 43 filters said randomly generated challenge code RAND, said expectation code XRES, and said network authentication token AUTN, and forwards these codes to core server interface 42, which filters challenge code RAND, and network authentication token AUTN and forwards them to said TCU interface 12 of said telematic control unit 10, which sends them to SIM-Card 15 on GSM module 14 (steps 103a to 103d).

In a next step 104, said SIM-Card 15 preferably compares said network authentication token AUTN with a code generated on the basis of a pre-stored secret network key on said SIM-Card 15. In case of a match of these codes, SIM-Card 15 generates a result code RES based on challenge code RAND and a secret unique key securely stored on SIM-Card 15, which is afterwards sent via said TCU interface 12 to said authentication server 43 of said core server system 40 using said IP-based data connection (steps 105a to 105c).

Said authentication server 43 finally compares said received result code RES with said expectation code XRES (step 106). In case of a match, telematic control unit 10 is successfully authenticated and an authentication token xT for authentication of said telematic control unit 10 at the start of a payload data communication or session is generated in said authentication server 43 of said core server system 40 (step 106). Said generated authentication token xT is preferably based on the hardware identifier of said telematic control unit 10. In particular, said hardware identifier is said microcontroller unit number MCUID of said telematic control unit 10. Said authentication token xT may comprise said microcontroller unit number MCUID, a time stamp, in particular a validity date vD, and an RSA signature. Said time stamp of said authentication token xT indicates an expiration time of the authentication token xT, after which it cannot be used any longer for authenticating telematic control unit 10 at said core server system 40. The authentication token xT is sent from authentication server 43 to said core interface server 42 (step 107a), and from core interface server 42 to telematic control unit 10 using said TCU interface 12 (step 107b). It may also be stored in said MQTT server 44 and in said core interface server 42, but in preferred embodiments this is not necessary, as explained above.

Said TCU interface 12 comprises an MQTT stack 13 of said telematic control unit 10. Said MQTT stack 13 is connected to said MQTT server 44 of said core server system 40 by an internet protocol transport connection, in particular an MQTT connection. In a next step 108, said MQTT stack 13 sends said authentication token xT to said MQTT server 44 to authenticate said telematic control unit 10 on said core server system 40 based on said authentication token xT, using said internet protocol transport connection.

Said MQTT server 44 may compare said received authentication token xT and with a stored authentication token xT in step 109. Alternatively, MQTT server 44 may split said authentication token xT in several parts, like said hardware identifier, in particular said microcontroller unit number MCUID, a validity date vD and said RSA token signature. Afterwards the hash key signature is verified in said MQTT server 44 by means of the public key of the core server system. In case of a successful verification of the signature, said validity date vD is compared to the current date. If that comparison shows that the token has expired, a new authentication token xT may be generated and transmitted to the telematic control unit by repeating steps iota to 107b. Otherwise, if the token has not yet expired, a payload data communication 35 like an MQTT session between said telematic control unit 10 and said core server system 40 system is started, vie that IP-based connection, in particular TCP/IP connection, using an application layer protocol like a message queuing telemetry transport protocol (step 110).

Steps 111 to 113 show an alternative use case based on the HTTP(s) protocol. In step 111, said authentication token xT is sent from said interface of the telematic control 12 unit to said core server interface 42 in an HTTP(s) request message, and verified or checked by the core server interface in the same manner as described above in the context of the MQTT session establishment (step 112). Is the verification is successful, the core server system 40, in particular the core server interface 42 replies with an HTTP(s) response including the 200 status code, indicating that the HTTP(s) request was successful (step 113), and application layer payload (use) data. In this use case, the payload data communication after successful authentication of the telematic control unit by means of the authentication token (xT) comprises just this HTTP(s) response message.

Figure 2:
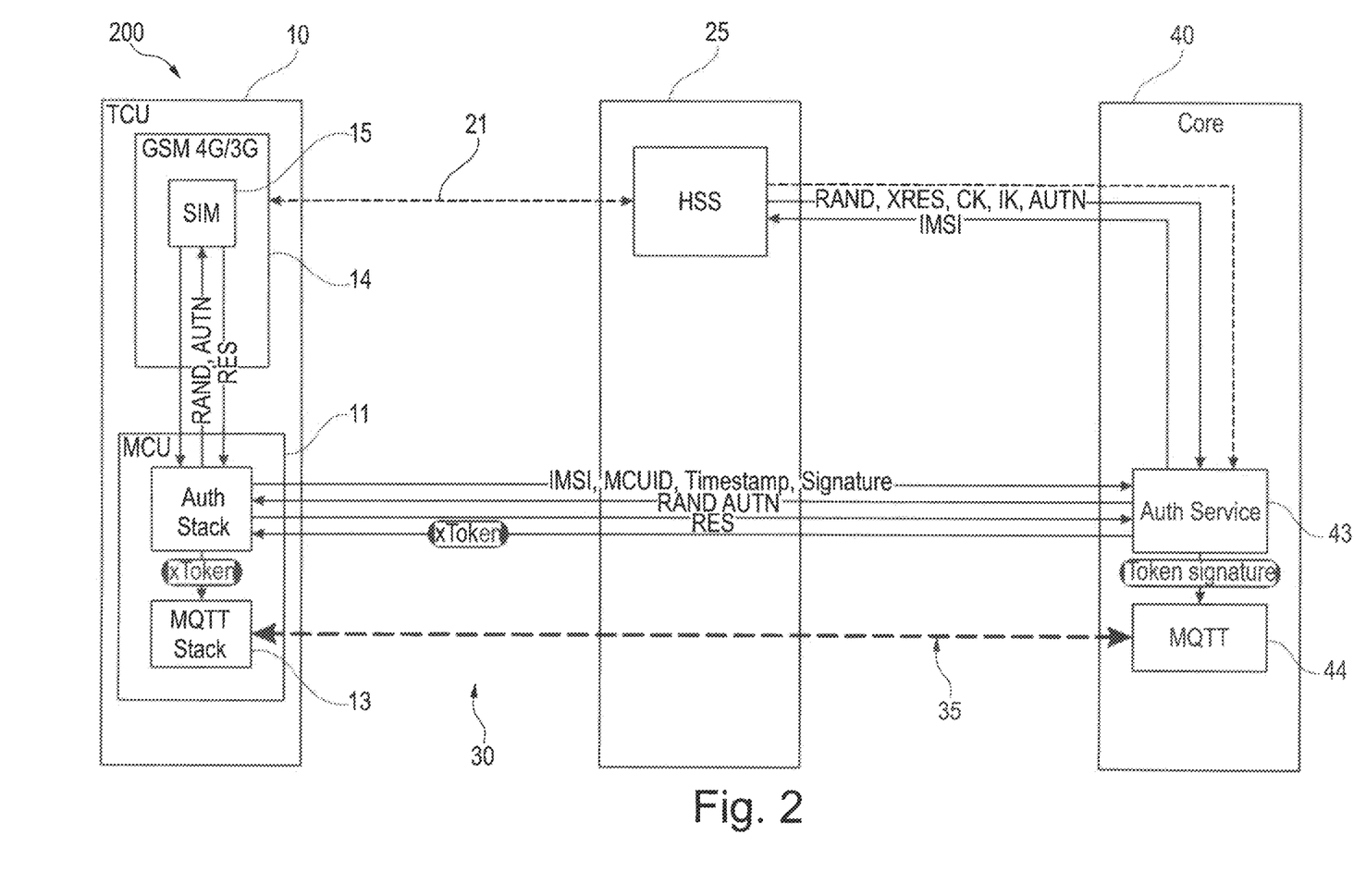
FIG. 2 shows a first embodiment of the inventive authentication system for authentication of a telematic control unit for a machine for industrial usage.

FIG. 2 discloses an authentication system 200 for authenticating a telematic control unit 10 for a machine for industrial usage with a core server system 40. The authentication system 200 comprises a telematic control unit 10, a telecommunication server in the form of an HSS 25 and a core server system 40, which is embedded in a cloud system 50. Using said authentication system 200, the method for authentication of a telematic control unit 10 for a machine for industrial usage described in FIG. 1 may be performed.

Said telematic control unit 10 comprising a GSM module 14 is configured to perform an authentication request from said GSM module 14 to a telecommunication server 25 comprising before-mentioned identifier of an identity module, like an IMSI (International Mobile Subscriber Identity) number of a SIM-Card 15 comprised by said GSM module 14 of said telematic control unit 10. Said authentication request is sent on a connection of a public land mobile network, preferably a 3GPP standard connection 21. Said IMSI number is stored on said SIM-Card 15. Said telematic control unit 10 comprises a microcontroller (unit) ii, with a TCU interface and an MQTT stack 13. Furthermore, said telematic control unit 10 comprises a communication connection 16 to communicate with said machine of usage. Said home subscriber server (HSS) 25 is configured to generated the authentication vector for said telematic control unit 10 as described above. Said core server system 40 is configured to generate an authentication token xT for authentication of said telematic control unit 10 in said core server system 40, wherein said authentication token xT is preferably based on a hardware identifier, in particular said microcontroller unit number MCUID of the microcontroller ii of said telematic control unit 10. Said core server system 40 is further configured to authenticate said telematic control unit 10 at the start a payload data communication or session 35 between said telematic control unit 10 and said core server system 40 by using an IP-based connection and an application layer protocol.

Said home subscriber server 25 is configured to compare said identifier of said GSM module 14 to identifiers hosted in said home subscriber server 25, and after acceptance of the identifier, said home subscriber server 25 is configured to generate said authentication vector.

Said core server system 40 is connected to said telecommunication server 25, and said core server system 40 comprises said authentication server 43 as computing unit, which is configured to generate an authentication token xT for authentication of said telematic control unit 10 in said core server system 40.

Figure 3:
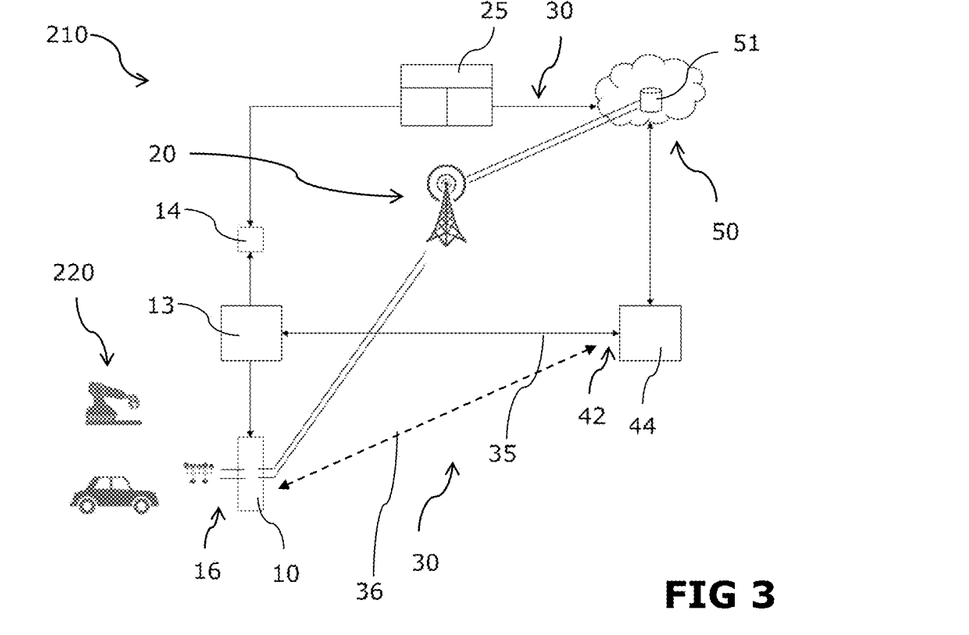
FIG. 3 shows a further embodiment of said inventive authentication system for authentication of a telematic control unit for a machine for industrial usage.

FIG. 3 discloses an authentication system 210 for authentication a telematic control unit 10 for a machine for industrial usage 220 with a core server system 40. Said authentication system 210 comprises the same components like said authentication system 200, and in addition said authentication system 210 comprises at least one machine for industrial usage 220. Said telematic control unit 10 is connected to said machine for industrial usage 220 using a communication connection 16. Using said authentication system 220, the method for authentication of a telematic control unit 10 for a machine for industrial usage 220 described in FIG. 1 may be performed, while said generated authentication token xT in step 106 is preferably based on a hardware identifier of said telematic control unit 10 and may in addition be based on a hardware identifier of said machine for industrial usage 220. Said hardware identifier of said machine for industrial usage 220 comprises a machine identification number. Said MQTT server 44 may compare said received authentication token xT and with a stored authentication token xT (step 109), which includes in addition said hardware identifier of said machine for industrial usage 220. Furthermore, said authentication token xT is verified in said core server interface 42 (step 112). Said cloud 50 comprises a database 51 for storing e.g. the aforementioned authentication token xT and/or for storing data

The invention claimed is:

1. A method for operating a core server system for authentication with a telematic control unit (TCU) authorized to access the core server system, the TCU being associated with a hardware identifier and comprising an identity module storing an identity identifier, the method comprising:
   receiving the identity identifier and the hardware identifier from the TCU;
   verifying whether the hardware identifier is associated with the TCU authorized to access the core server system;
   transmitting the identity identifier to a telecommunication server;
   receiving, from the telecommunication server, a challenge code and an expected response (XRES) based on the challenge code and a secret key specific to the identity identifier;
   storing the XRES and sending the challenge code to the TCU;
   receiving, from the TCU, a response (RES) based on the challenge code and the secret key specific to the identity identifier;
   comparing the RES to the XRES, and when the RES is equal to the XRES:
   generating an authentication token (xT) on the core server system and sending the xT to the TCU;
   receiving the xT from the TCU;
   after receiving the xT from the TCU, authenticating the TCU on the core server system based on the transmitted xT; and
   after authenticating the TCU on the core server system, starting a payload data communication between the TCU and the core server system.

2. The method of claim 1, wherein the TCU is for a machine for industrial usage.

3. The method of claim 1, wherein the TCU is for a vehicle.

4. The method of claim 1, wherein the core server system is connected to a telecommunication server of a public land mobile network (PLMN).

5. The method of claim 1, wherein the payload data communication between the TCU and the core server system uses an Internet Protocol (IP) based application layer protocol.

6. The method of claim 5, wherein the IP based application layer protocol is a message queuing telemetry transport (MQTT).

7. The method of claim 5, wherein the IP based application layer protocol is a hypertext transfer protocol (HTTP).

8. A method for operating a telematic control unit (TCU) for authentication with a core server system, the TCU being associated with a hardware identifier and comprising an identity module storing an identity identifier, the method comprising:
   sending the identity identifier and the hardware identifier to the core server system;
   receiving a challenge code from the core server system;
   generating a response (RES) based on the challenge code and a secret key specific to the identity identifier;
   sending the RES to the core server system;
   receiving an authentication token (xT) from the core server system;
   sending the xT to the core server system; and
   after sending the xT to the core server system, starting a payload data communication with the core server system.

9. The method of claim 8, wherein the TCU is for a machine for industrial usage.

10. The method of claim 8, wherein the TCU is for a vehicle.

11. The method of claim 8, wherein the core server system is connected to a telecommunication server of a public land mobile network.

12. The method of claim 8, wherein the payload data communication between the TCU and the core server system uses an Internet Protocol (IP) based application layer protocol.

13. The method of claim 12, wherein the IP based application layer protocol is a message queuing telemetry transport (MQTT).

14. The method of claim 12, wherein the IP based application layer protocol is a hypertext transfer protocol (HTTP).

15. A telematic control unit (TCU) for a machine for industrial usage, the TCU being associated with a hardware identifier and comprising:
- an identity module storing an identifier of the identity module; and
- a secret key specific to the identifier of the identity module; and
- means for communication with a core server system;
- wherein the TCU is configured to:
- send the identifier of the identity module and the hardware identifier to the core server system;
- receive a challenge code from the core server system;
- generate a response (RES) based on the challenge code and a secret key specific to the identifier of the identity module;
- send the RES to the core server system;
- receive an authentication token (xT) from the core server system;
- send the xT to the core server system; and
- after sending the xT to the core server system, start a payload data communication with the core server system.

16. The TCU of claim 15, wherein the TCU is for a vehicle.

17. The TCU of claim 15, wherein the core server system is connected to a telecommunication server of a public land mobile network (PLMN).

18. The TCU of claim 15, wherein the payload data communication between the TCU and the core server system uses an Internet Protocol (IP) based application layer protocol.

19. The TCU of claim 18, wherein the IP based application layer protocol is a message queuing telemetry transport (MQTT).

20. The TCU of claim 18, wherein the IP based application layer protocol is a hypertext transfer protocol (HTTP).

* * * * *